United States Patent [19]
Hisabayoshi et al.
[11] 4,367,038
[45] Jan. 4, 1983

[54] EXPOSURE CONTROL SYSTEMS FOR USE IN COPYING MACHINE

[75] Inventors: Satoshi Hisabayoshi, Hachioji; Masahiro Kogiso, Fussa; Yousuke Igarashi, Tachikawa; Yoshio Horiguchi, Hachioji, all of Japan

[73] Assignee: Iwatsu Electric Co., Ltd., Tokyo, Japan

[21] Appl. No.: 281,540

[22] Filed: Jul. 8, 1981

[51] Int. Cl.[3] .................... G03G 15/00; G03B 27/54; G03B 27/52

[52] U.S. Cl. .................................. 355/70; 355/14 E; 355/55

[58] Field of Search ......................... 355/14 E, 55–57, 355/60, 67–71, 83

[56] References Cited

U.S. PATENT DOCUMENTS 3,795,444 3/1974 Glidden et al. ........................ 355/68
3,884,576 5/1975 Mochimaru et al. ................. 355/69
4,113,378 9/1978 Wirtz ............................... 355/71 X

*Primary Examiner*—R. L. Moses
*Attorney, Agent, or Firm*—Townsend and Townsend

[57] ABSTRACT

In a copying machine of the type comprising an image projecting lens movable in a direction of an optical axis thereof for varying a magnifying power, a reflecting mirror interlocked with the lens for effecting focusing, and two groups of light sources for illuminating a manuscript, there is provided an exposure control system comprising variable resistors driven by the projecting lens, oscillators for generating pulse signals of frequencies varying in accordance with resistance variations of the variable resistors and with a variation in a source voltage, counters counting the number of the pulse signals in accordance with an exposure index, and switch means for lighting the light sources during intervals determined by an exposure index.

11 Claims, 9 Drawing Figures

EXPOSURE CONTROL SYSTEMS FOR USE IN COPYING MACHINE

BACKGROUND OF THE INVENTION

This invention relates to an exposure control system for use in such a copying machine as an electric copying machine, a graphic arts copying machine or the like that can automatically control the exposure time.

Usually, in a copying machine in which a manuscript and an image focusing plane are held stationary, light is projected upon the surface of the manuscript from an exposure light source and the image of the manuscript is focused on the image focusing plane through a projection lens to form a copy. Where it is desired to vary the magnifying power, the projecting lens is moved along the optical axis thereof and at the same time, for the purpose of varying the total optical path length, a reflection mirror interposed between the manuscript and the projecting lens is also moved to obtain correct focusing.

For this reason, as the magnifying power is increased, the distance between the projecting lens and the focusing plane is also increased, thus decreasing the quantity of light incident upon the focusing surface. On the other hand, decrease in the magnifying power decreases the distance between the projecting lens and the focusing surface, thus increasing the quantity of light incident upon the focussing surface.

The projecting lens and the reflection mirror are moved in parallel with the optical axis inside the manuscript support, but as the optical axis between the manuscript and the reflection mirror is moved across the center of the manuscript surface the image focusing position is displaced from the center of the focusing plane with the result that the distribution of the quantity of the incident light upon the focusing plane becomes nonuniform due to the $\cos^4$ law of lens, thereby making nonuniform the light distribution of the focused image.

To obviate this difficulty, a voltage phase control system has been used in which after adjusting the light quantity of the light source, the light source is lighted for a definite interval. However, as pointed out above, since copying is made with an incident light distribution which becomes nonuniform due to illumination based on the $\cos^4$ law of lens, it has been impossible to eliminate nonuniformity of the exposure light quantity due to this maldistribution. Moreover, with this voltage phase control system, it has been impossible to obviate electrical noise caused by the variation in the source voltage waveform.

SUMMARY OF THE INVENTION

Accordingly, it is an object of this invention to provide a novel exposure control system for use in a copying machine capable of eliminating the problems described above, and of providing uniform exposure light and in which generation of electric noise can be minimized.

Broadly, according to the invention there is provided an exposure control system for a copying machine comprising:

pulse generator means having a time constant circuit connecting terminal which is coupled with a CR circuit for generation of a reference frequency and a control voltage terminal, said pulse generator means being responsive to changes in voltage applied to the control voltage terminal to generate a pulse train of variable frequencies;

voltage variation detecting means connected to receive source voltage acting as drive for a light source adapted to illuminate a manuscript and comparing the source voltage with a reference voltage to detect a variation in said source voltage relative to the reference voltage; and drive means, including a counter connected to receive said pulse train to count a number of pulses corresponding to a preset exposure index, for lighting said light source for illumination of the manuscript during only an interval for counting the number of pulses corresponding to the preset exposure index following reception of said pulse train.

BRIEF DESCRIPTION OF THE DRAWINGS

Further objects and advantages of the present invention can be more fully understood from the following detailed description taken in conjunction with the accompanying drawings, in which.

DESCRIPTION OF THE PREFERRED EMBODIMENT

Figure 1:
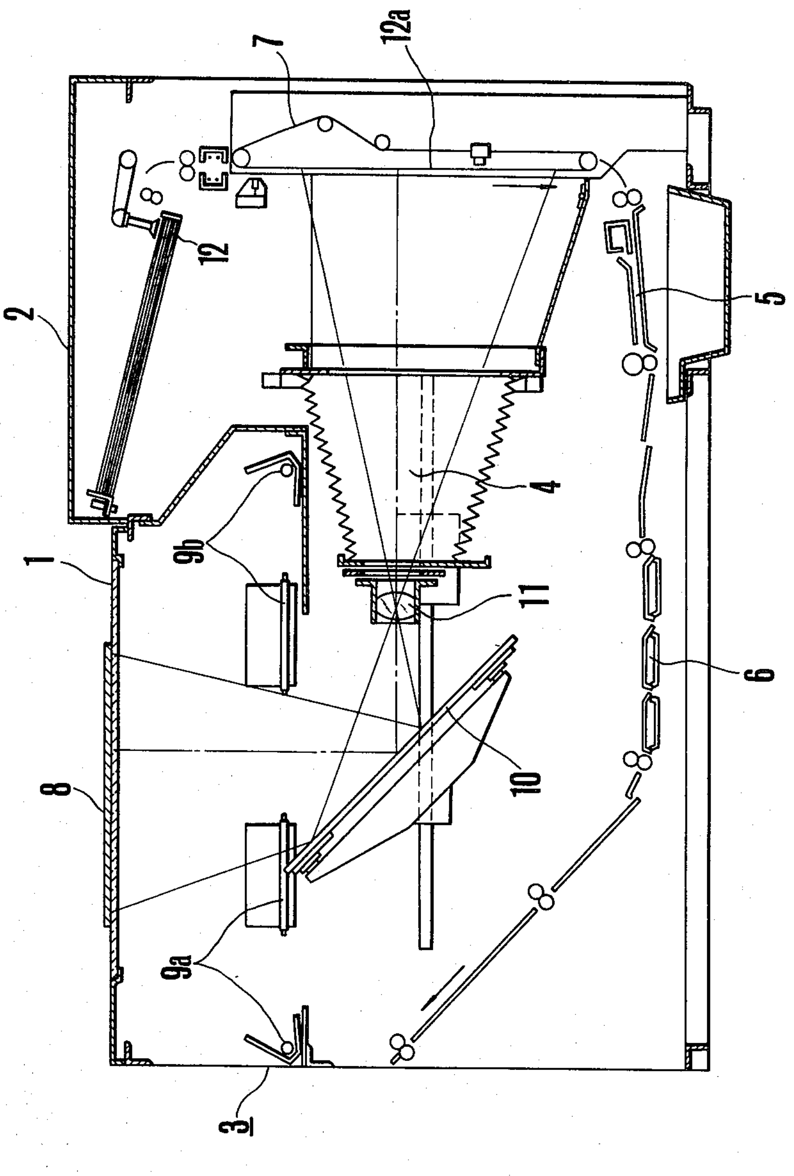
FIG. 1 is a diagrammatic sectional view showing a copying machine.

As shown in FIG. 1, a casing of a copying machine generally designated at numeral 3 is provided with a transparent manuscript support 1 made of glass plate or the like, and an operating panel 2 on the upper surface of the casing. Inside the casing are disposed an exposure device 4, a developing device 5, a fixing device 6 and a conveyor belt 7 for conveying a photosensitive paper between the exposure device, the developing device and the fixing device. A manuscript 8 mounted on the manuscript support 1 is illuminated by the light emitted by light sources **9*a* and 9*b* for focusing the image of the manuscript on the photosensitive paper held at the exposure station 12*a* through a reflecting mirror 10 and a projecting lens 11**.

The photosensitive papers are fed, one after another, onto the conveyor belt 7 from a magazine box 12, and after being exposed to light, the photosensitive papers are successively conveyed in a direction shown by arrow to a discharge opening by the conveyor belt 7.

According to the magnifying power of the copying machine, the projecting lens 11 and the reflecting mirror 10 are moved in the direction of the optical axis, that is in the horizontal direction as viewed in FIG. 1.

Figure 2:
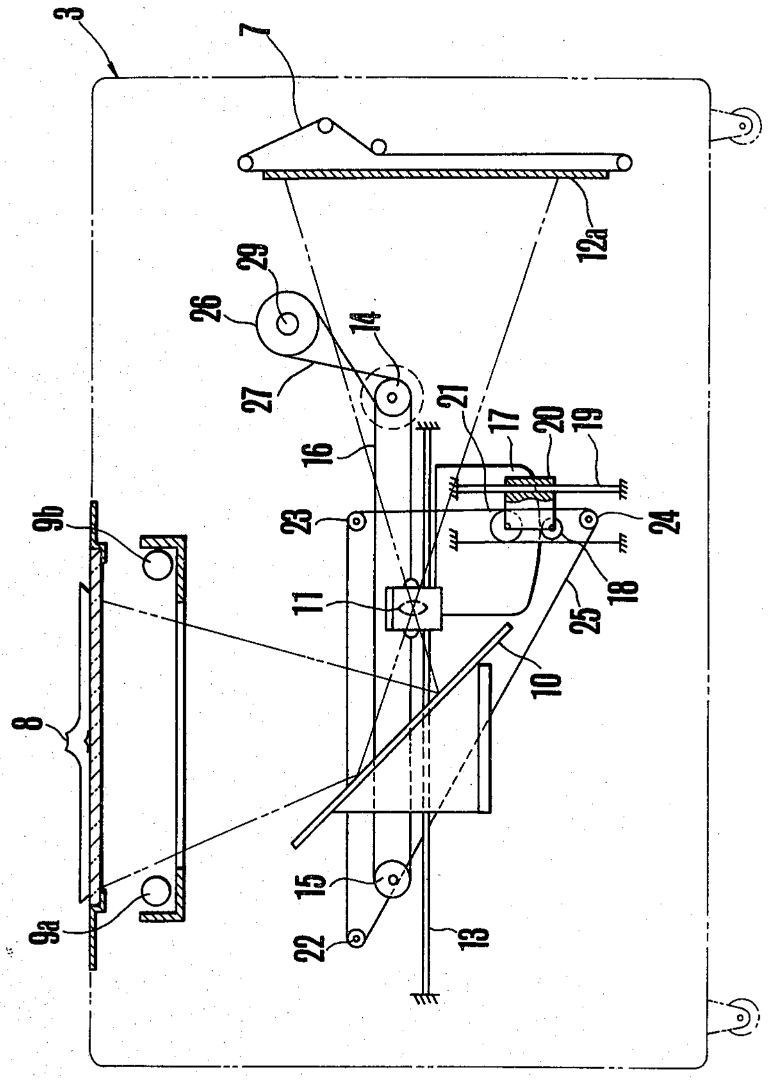
FIG. 2 is a side view principally showing a mechanism for moving a projecting lens and a reflection mirror.

The mechanism of moving the projecting lens 11 and the reflecting mirror 10 is shown in FIG. 2. More particularly, a horizontal rod 13 with both ends fixedly secured to a stationary portion is provided immediately beneath the transparent manuscript support 1 for movably support the reflecting mirror 10 inclined at an angle of 45° with respect to the longitudinal axis of the horizontal rod, and the projecting lens 11. Pulleys 14 and 15 are located on both sides of the range of movement of the projecting lens 11 and an endless wire loop 16 is passed about the pulleys 14 and 15. The projecting lens 11 is secured to the wire loop 16. The pulley 14 is driven by a source of drive to move the projecting lens 11 leftwards and rightwards.

Figure 3:
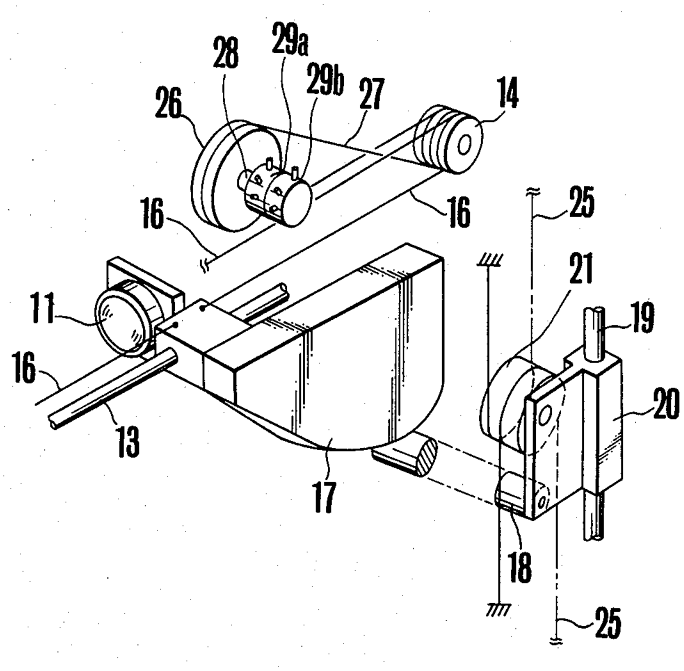
FIG. 3 is a perspective view showing an interlocking mechanism between the projecting lens and the reflection mirror.

As shown in FIG. 3, a disc cam 17 is secured on one side of the projecting lens 11 with the lower periphery of the cam contacted with a contact member 18 secured to a slider 20 which slides along a guide rod 19 with its upper and lower ends secured to the casing 3.

A pulley 21 is rotatably mounted on the slider 20 and both ends of a wire 25 are wrapped about a pulley 21 in the opposite directions, the wire 25 passing about pulleys 22 and 23 positioned on both sides of the range of movement of the reflecting mirror 10 and about a pulley 24 located beneath the reflecting mirror 10. An intermediate point of the wire 25 is secured to the upper portion of the reflecting mirror 10, while both ends of the wire 25 are secured to the casing 3.

Consequently, as the cam 17 is moved by the movement of the projecting lens 11, the slider 20 is moved in the vertical direction so as to reciprocate the wire 25 together with the reflecting mirror 10.

An endless loop wire 27 is crosswisely passed about another pulley 26 and the pulley 14 so as to operate two variable resistors 29*a* and 29*b* mounted on a shaft 28 of the pulley 26 as the pulley 14 is rotated. In this manner, the resistance values of the variable resistors 29*a* and 29*b* are varied when the projecting lens 11 is moved.

Six light sources 9*a* and 9*b* in the form of incandescent lamps are mounted about the periphery of the transparent manuscript support 1. These lamps are divided into two groups A and B on both sides of the projecting lens 11 and the lightings of the two groups are independently controlled by an exposure control system.

Figure 4:
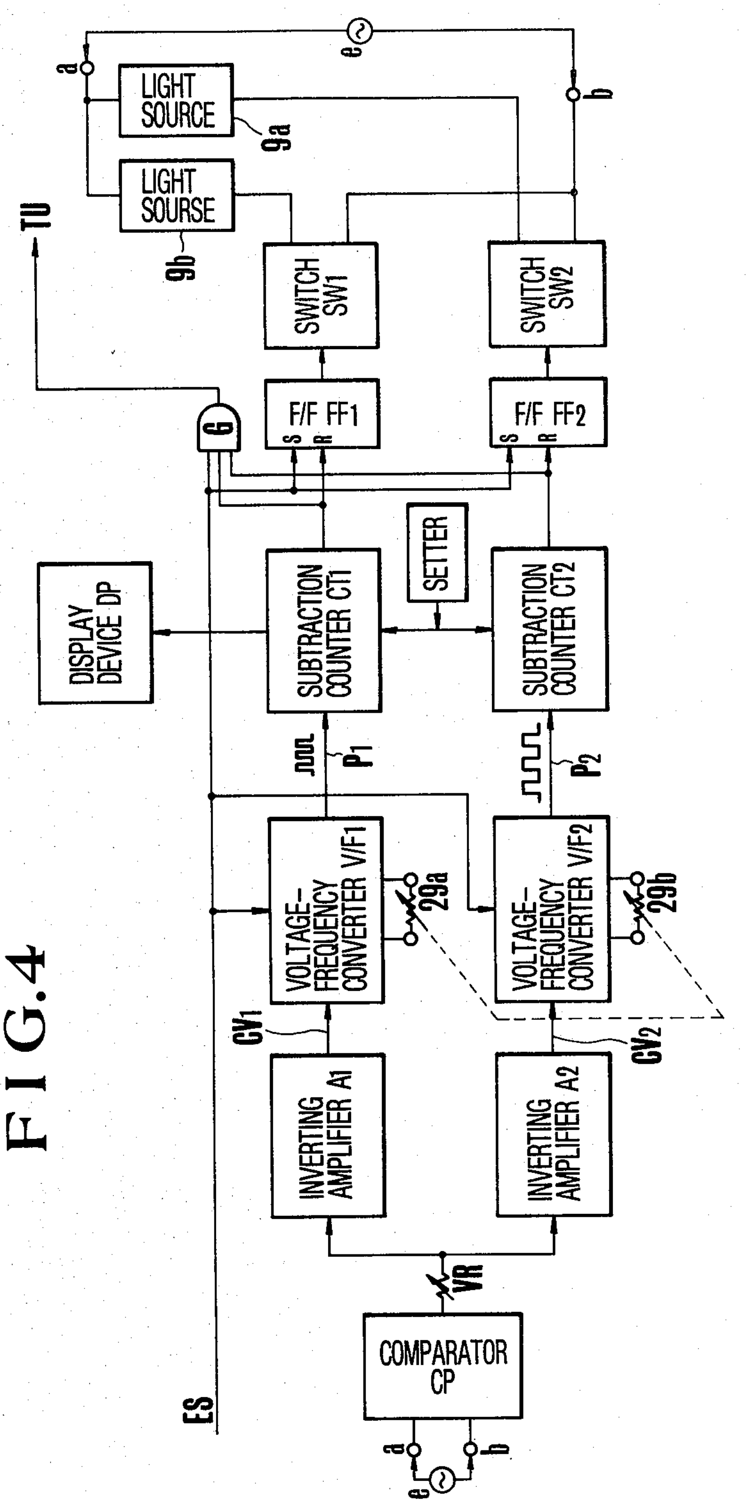
FIG. 4 is a block diagram showing a control system embodying the invention.

As shown in FIG. 4, in the control system, a source voltage e applied across terminals a and b is compared with a reference voltage, not shown, by a comparator CP, and the output of the comparator CP is applied to inverting amplifiers A1 and A2 in the form of differential amplifiers via a variable resistor VR adapted to adjust the comparator output and the outputs of the inverting amplifiers A1 and A2 are applied to voltage-frequency converters V/F1 and V/F2 as control voltages CV1 and CV2.

The variable resistors 29*a* and 29*b* shown in FIG. 3 are respectively connected to the voltage-frequency converters V/F1 and V/F2 for varying the frequencies of the pulse signals P1 and P2 produced by the voltage frequency converters V/F1 and V/F2 in accordance with the voltage values of the variable resistors 29*a* and 29*b* and the control voltages CV1 and CV2 as will be described later.

The generation of the pulse signals P1 and P2 is initiated by an exposure start signal ES and these signals are applied to presettable down or subtraction counters CT1 and CT2 as subtraction pulse for subtracting a preset value set by a setter ST according to an exposure index. When the contents of the subtraction counters CT1 and CT2 become zero, their outputs changes from "L" (low level) to "H" (high level).

For this reason, flip-flop circuits FF1 and FF2 which have been set by the exposure start signal ES would be reset by the change in the outputs of the subtraction counters CT1 and CT' so that their outputs are changed to "L" from "H". Accordingly, switches SW1 and SW2 which have been closed for lighting lamps 9*a* and 9*b* during the set states of the flip-flop circuits FF1 and FF2 are opened to turn off the lamps 9*a* and 9*b*.

Upon completion of the subtraction operations of the subtraction counters CT1 and CT2, their outputs "H" enables and AND gate circuit G for causing it to produce a time-up signal TU.

The content of the subtraction counter CT1 is displayed by a display device DP in the form of a digit display device, for example, for making it easy to confirm the preset value preset by the setter ST and the content of the counter during the subtraction operation.

As described above, a first voltage variation detector comprised of the comparator CP and the inverting amplifier A1, a first pulse generator comprised of the voltage frequency converter V/F1, a first drive comprises of the counter CT1, flip-flop circuit FF1 and switch SW1, a second voltage variation detector comprised of the comparator CP and the inverting amplifier A2, a second pulse generator comprised of the voltage-frequency converter V/F2, and a second drive comprised of the counter CT2, flip-flop circuit FF2 and switch SW2 constitute control systems for lamp groups A and B (lamps 9*a* and 9*b*) respectively, whereby pulse signals P1 and P2 having frequencies corresponding to the variations in the resistance values of variable resistors 29*a* and 29*b* and to the variation in the source voltage e are produced. Accordingly, only during an interval in which the number of the pulse signals P1 and P2 is counted according to the exposure index, the lamps 9*a* and 9*b* are individually lighted.

Figure 5:
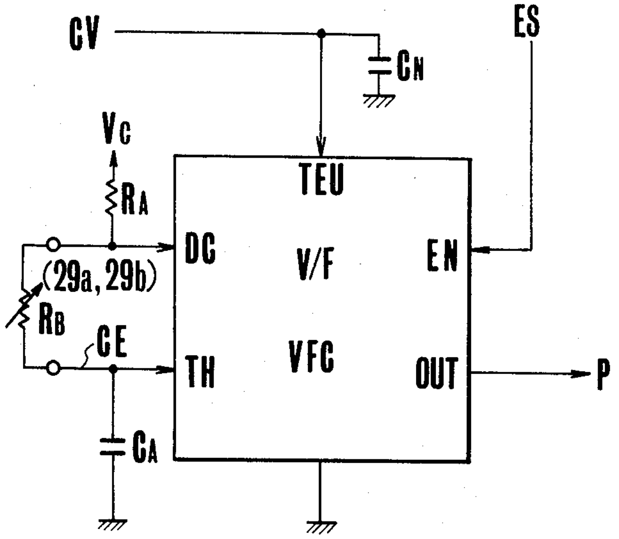
FIG. 5 is a block diagram showing details of a voltage-frequency converter.
Figure 6:
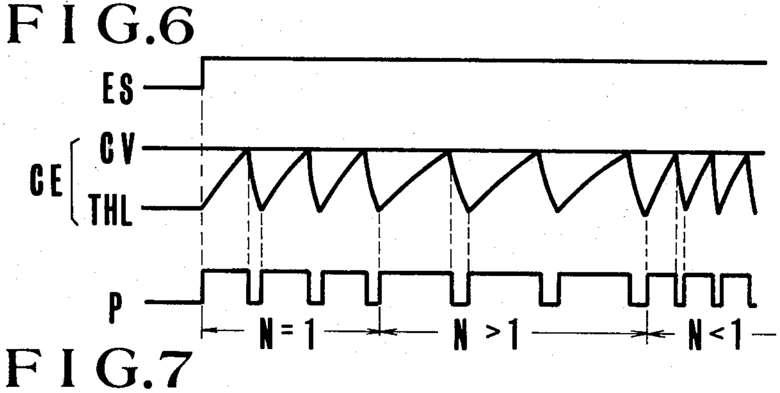
FIGS. 6 and 7 show waveforms at various portions of the circuits shown in FIG. 5.
Figure 7:
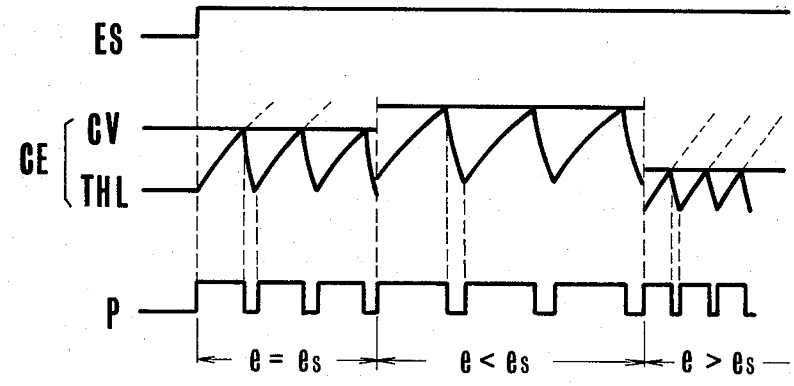

As shown in FIG. 5, each of the voltage-frequency converters V/F1 and V/F2 is constituted by an HA 17555 type integrated circuit (manufactured by Hitachi Seisakusho, Japan), for example, containing a charge/-discharge type oscillator, a waveform shaping circuit, etc., and operates as shown by FIGS. 6 and 7 showing waveforms of various parts of the voltage-frequency converter.

More particularly, when the exposure start signal ES applied to an enabling terminal EN connected to a noise eliminating capacitor $C_N$ becomes "H", the oscillator starts to oscillate to charge a capacitor $C_A$ to gradually increase its terminal voltages CE. When this terminal voltage CE reaches a limiting voltage CV applied to an upper limit threshold terminal THU, the capacitor $C_A$ begins to discharge to rapidly decrease its terminal voltage CE. When the terminal voltage decreases to a lower limit threshold voltage THL about $\frac{1}{3}$ of the control voltage CV, the capacitor $C_A$ is charged again and the above-described cycle of operation is repeated.

Denoting the resistance value of the variable resistor 29*a* or 29*b* connected across the discharge terminal DC and the threshold terminal TH by $R_B$, the oscillation frequency f determined by the period of charging and discharging is given by the following equation:

$$f = \frac{1.44}{(R_A + 2 \cdot R_B)CA} \quad (1)$$

The variation in the terminal voltage CE of the capacitor $C_A$ is removed by a waveform shaping circuit and the shaped voltage is outputted from the output terminal OUT as a pulse signal P.

Accordingly the frequency of the pulse signal is caused to vary as shown in FIG. 6 due to the variation in the resistance values of the variable resistors 29*a* and 29*b* caused by the movement of the projecting lens 11 corresponding to the set value of the magnifying power of the copying machine. When the magnifying power N is larger than unity, meaning an enlargement, the oscillation frequency decreases, whereas when $N<1$, meaning a reduction, the oscillation frequency increases.

Since the upper limit threshold voltage at which the capacitor is changed from charging to discharging state is governed by the control voltage CV, the oscillation frequency also varies depending upon the variation in the source voltage e, so that as shown in FIG. 7, when the source voltage e becomes lower than the reference voltage $e_s$, that is $e<e_s$, the oscillation frequency decreases, whereas when $e>e_s$ the oscillation frequency increases.

Figure 8:
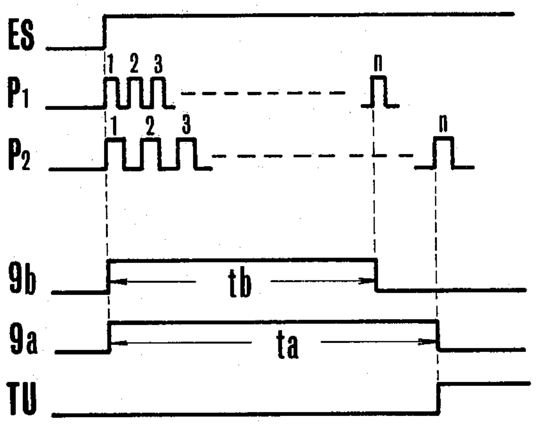
FIG. 8 is a timing chart showing the relationship between a pulse signal and a lighting state of a light source.

FIG. 8 is a timing chart showing the relationship between pulse signals P1 and P2 and lightings of lamps 9*a* and 9*b*. As shown, when the exposure start signal ES is "H", generation of the pulse signals P1 and P2 is started simultaneously so that both subtraction counters CT1 and CT2 execute subtraction operations from the same preset value, and during an interval through which n pulse signals P1 and P2 are counted, lamps 9*a* and 9*b* are lighted. Upon completion of the subtraction operations of both counters CT1 and CT2, the time-up signal TU changes to "H".

In this case, however, since the frequency of the pulse signal P1 is higher than that of the pulse signal P2, the subtraction operation of the counter $CT_1$ completes earlier than that of the counter $CT_2$ so that the operating time $t_b$ of the lamp 9*b* is shorter than that $t_a$ of the lamp 9*a*.

Figure 9:
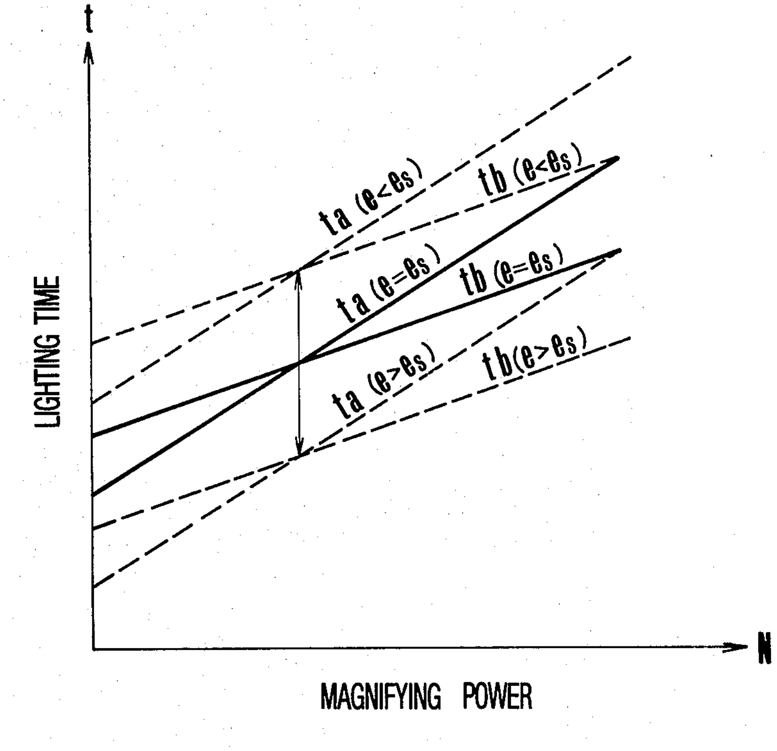
FIG. 9 is a graph showing the relation between the magnifying power of the copying machine and the operating time of the light source.

FIG. 9 shows the relationship between the lighting time t of lamps 9*a* and 9*b* and the variation in the magnifying power N during the operation described above in which the relationship when the source voltage e is equal to the reference voltage $e_s$ is shown by solid lines, whereas the relationship when $e<e_s$ or $e>e_s$ is shown by broken lines.

Thus, as the magnifying power increases both lighting times $t_a$ and $t_b$ are extended, whereas when the magnifying power N decreases the lighting times $t_a$ and $t_b$ are both shortened. Moreover, as the lighting times differentially vary in accordance with the magnifying power N, the nonuniform distribution of the quantity of the light incident upon the image plane caused by the movement of the reflecting mirror 10 can be compensated for. Moreover, as the lighting times $t_a$ and $t_b$ vary parallelly and in opposite directions in response to the variation in the source voltage, the variation in the brightness of the light illuminating the manuscript surface caused by the variation in the source voltage e can be obviated, thus always ensuring adequate quantity of exposure.

Any means for driving variable resistors 29*a* and 29*b* for varying their resistance values can be selected according to conditions. Also, the construction shown in FIG. 4 can be varied in accordance with the conditions so that it is possible to adopt various modifications.

As described above, according to this invention, the nonuniformity in the quantity of light incident upon the image projecting plane caused by the variation in the magnifying power can be automatically corrected, and the variation in the quantity of light emitted by a light source caused by the variation of the source voltage can also be automatically corrected. Accordingly, as it is possible to always provide a required amount of the exposure light over the entire area of the image projecting plane, an accurate light exposure can be ensured which is advantageous for various types of the copying machines.

While, in the foregoing embodiment, the invention has been described by way of example of a copying machine of the variable magnifying power type wherein the image focusing position is displaced from the center of the focusing plane as the magnifying power varies, it is obvious that the invention can also be applied to a copying machine of the fixed magnifying power type and/or a variable magnifying power type copying machine in which the image focusing position will not displace from the center of the focusing plane as the magnifying power varies, in order to automatically correct the variation in the quantity of light emitted by a light source caused by the variation of the source voltage. In these modification, the control circuit comprised of the inverting amplifier A2, voltage-frequency converter VF2, subtraction counter CT2, flip-flop circuit FF2 and switch SW2 as shown in the embodiment of FIG. 4 can be eliminated. In addition, in the case of the fixed magnifying power type copying machine, the variable resistor 29*a* can be replaced with a fixed resistor to generate a fixed reference frequency.

What is claimed is:

1. An exposure control system for a copying machine comprising:

pulse generator means having a time constant circuit connecting terminal coupled with a CR circuit for generation of a reference frequency and a control voltage terminal, said pulse generator means being responsive to changes in voltage applied to the control voltage terminal to generate a pulse train of variable frequencies;

voltage variation detecting means connected to receive source voltage acting as drive for a light source adapted to illuminate a manuscript and comparing the source voltage with a reference voltage to detect a variation in said source voltage relative to the reference voltage; and drive means, including a counter connected to receive said pulse train to count a number of pulses corresponding to a preset exposure index, for lighting said light source for illumination of the manuscript only during an interval for counting the number of pulses corresponding to the preset exposure index following reception of said pulse train.

2. An exposure control system as recited in claim 1 wherein said CR circuit comprises a variable resistor which is varied in accordance with the magnifying power.

3. An exposure control system as recited in claim 1 wherein said voltage variation detecting means comprises a comparator for comparison of said source voltage with the reference voltage, and an inverting amplifier for amplification of the output of said comparator.

4. An exposure control system for a copying machine comprising:

a pair of light sources adapted to illuminate a manuscript mounted about the periphery of a manuscript support;

first and second pulse generator means each having a time constant circuit connecting terminal and a terminal for reception of a control voltage to generate a pulse train of a frequency which is determined by the time constant circuit and the control voltage, said first and second pulse generator means being connected to first and second CR circuits through the time constant circuit connecting terminals, respectively, and said first and second CR circuits having each a variable resistor which is varied in accordance with the magnifying power;

first and second voltage variation detecting means connected to receive source voltage acting as drive for the light sources for illumination of the manuscript, and comparing the source voltage with a reference voltage to detect a variation in said source voltage relative to the reference voltage and supplying the detected variation to the control voltage terminal of said first and second generator means; and first and second drive means associated with the respective paired light sources and including first and second counters respectively associated with said first and second pulse generator means to receive said pulse train so as to count a number of pulses corresponding to a preset exposure index, for lighting said light sources for illumination of the manuscript only during an interval for counting the number of pulses corresponding to the preset exposure index following reception of said pulse train.

5. An exposure control system as recited in claim 4 wherein said first and second voltage variation detecting means comprises a comparator for comparison of said source voltage with the reference voltage, and first and second inverting amplifiers for separately amplifying the output of said comparator, the output of said first inverting amplifier being connected to said first pulse generator means and the output of said second inverting amplifier to said second pulse generator means.

6. An exposure control system as recited in claim 1 or 4 wherein the counter comprises a subtraction counter which is preset with a predetermined count corresponding to the exposure index.

7. An exposure control system as recited in claim 1 or 4 wherein each pulse generator means comprises an integrated circuit of the type including a charge-discharge type oscillator and a waveform shaping circuit, a noise elimination capacitor connected to said integrated circuit, another capacitor connected to said oscillator, and means for charging and discharging said another capacitor for determining the frequency of said pulses produced by said oscillator.

8. An exposure control system as recited in claim 4 wherein said first and second voltage variation detecting means comprises a comparator (CP)) which compares said source voltage with the reference voltage, and a pair of inverting amplifier (A1, A2) for differentially amplifying an output of said comparator, wherein said first and second pulse generator means comprise a pair of voltage-frequency converter (VF1, VF2) respectively connected with said variable resistors and supplied with an exposure start signal (ES) and respective outputs of said inverting amplifiers (A1, A2) for producing said pulse trains whose frequencies vary in accordance with the resistance values of said variable resistors and the outputs of said respective inverting amplifiers and wherein said first and second drive means comprise a pair of presettable counters (CT1, CT2) counting the number of respective pulses outputted by said voltage-frequency converters thus varying counts of said counters, a pair of flip-flop circuits set by said exposure start signal and reset by variations in counts of said counters, and a pair of switch means for controlling lightings of respective groups of said light sources in accordance with counts of respective counters.

9. An exposure control system as recited in claim 8 which further comprises an AND gate circuit imputted with said exposure start signal (ES) and the outputs of said pair of counters for producing a time-up signal (TU).

10. An exposure control system as recited in claim 8 which further comprises display means for displaying a count of one of said counters.

11. An exposure control system as recited in claim 8 which further comprises a variable resistor connected between said comparator and said inverting amplifiers for adjusting a signal outputted by said comparator.

* * * * *